UNITED STATES PATENT OFFICE.

WARREN THOMPSON, OF PHILADELPHIA, PENNSYLVANIA, ASSIGNOR TO MONTGOMERY P. SIMONS.

IMPROVEMENT IN COLORING DAGUERREOTYPE-PICTURES.

Specification forming part of Letters Patent No. 3,085, dated May 12, 1843.

*To all whom it may concern:*

Be it known that I, WARREN THOMPSON, of the city of Philadelphia and county of Philadelphia and State of Pennsylvania, have invented a new and Improved Mode of Coloring Daguerreotype or Photographic Portraits or Pictures; and I do hereby declare that the following is a full and exact description.

The nature of my invention consists in coloring any daguerreotype or photographic portrait or picture by a new method of confining and limiting any color that I may wish to give to said picture to any particular part or parts of the said picture, thereby giving to the various parts of said picture such hues and colors as I may wish or desire to give the same or to any part thereof, and at the same time removing the substance I use without injury to the picture.

To enable others skilled in the art to make and use my invention, I will proceed to describe its operation and the means of producing the same.

I take an ordinary daguerreotype or photographic picture and steep it first into a solution of gum-tragacanth about the consistency of milk, so as to protect the whole surface of the picture from the grease I shall next put on them. Having determined upon what part or parts of the picture I desire to place any given color, I put on the parts of said picture which I desire to be without the color I mean to apply sterine or any oily substance, wax, spermaceti, or any soluble resin or gum, all the above-mentioned articles to be in a thin liquid and to be washed over said parts with an ordinary camel's-hair brush. The part or parts of said picture which I wish to color or tint I leave exposed or bare. I then take an ordinary or common electro-magnetic or galvanic battery, such as is used for silvering, gilding, or other purposes in the arts; then place the positive and negative poles of said battery in an open dish or saucer. If I desire to give a gold tint to the said part or parts of photographic picture, I pour into said saucer pure gold held in solution by cyanuret of potassium. I then immerse the plate or photographic picture in said solution, first placing the negative pole of said galvanic battery beneath the said photographic plate or picture so immersed and in contact with said plate or picture, and hold the positive pole of said battery over the said photographic plate or picture, with the point thereof slightly immersed in said solution, till the said daguerreotype or photographic plate, portrait, or picture shall have acquired the requisite tint, color, or hue by a longer or shorter immersion, which being obtained, I wash off the plate by steeping it in boiling lye.

If it is desired to give any other color, hue, or tint to any other part or parts of said picture, the said plate is prepared, as above and before described, by covering up those parts already colored and leaving exposed those to be colored, and producing the different tints or colors with the aid of said galvanic battery, as above and before described, by immersing said daguerreotype or photographic picture, portrait, or plate in any of the metallic solutions either in their pure chemical state or mixed together in such proportions as the color or hue to be given may require and as they will produce said colors as known in the arts.

The invention or discovery to which I particularly lay claim is—

The mode herein described, or any other substantially the same, of coloring a part or parts of daguerreotype-pictures.

WARREN THOMPSON.

Witnesses:
 J. LUCAS HIRST,
 BJN. H. BREWSTER.